United States Patent Office 3,351,608
Patented Nov. 7, 1967

3,351,608
STABILIZED POLYURETHANES
Harald Oertel, Kurt Ley, and Heinrich Rinke, Leverkusen, and Wilhelm Thoma, Cologne-Flittard, Germany, assignors to Farbenfabriken Bayer Aktiengesellschaft, Leverkusen, Germany, a German corporation
No Drawing. Filed Feb. 27, 1964, Ser. No. 347,662
Claims priority, application Germany, Mar. 1, 1963, F 39,144
5 Claims. (Cl. 260—45.9)

ABSTRACT OF THE DISCLOSURE

Polyurethane polymers are stabilized against discoloration and aging by having incorporated therein from about 0.1 to about 10 percent by weight of a compound having the formula

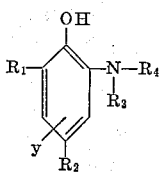

wherein $R_1$ and $R_2$ are hydrocarbon radicals having 4 to 10 carbon atoms with the carbon atom adjacent the aromatic ring being a tertiary carbon atom; $R_3$ is hydrogen, an alkyl radical, a cycloalkyl radical, an alkenyl radical or an aryl radical; $y$ is hydrogen, an alkyl radical, an aralkyl radical, a hydroxyl group or a halogen atom; $R_4$ is hydrogen, an alkyl radical, a cycloalkyl radical, an aryl radical, an aralkyl radical or one of the three following groups

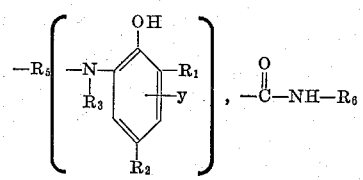

and

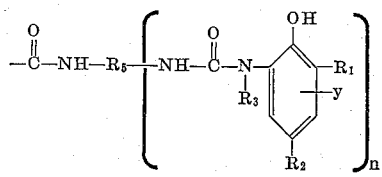

where $R_1$, $R_2$, $R_3$ and $y$ have the same meaning set forth above and $R_5$ is an aliphatic radical or an aromatic radical having a valence of 2 to 4; $R_6$ is hydrogen, an alkyl radical, a cycloalkyl radical, an aryl radical or an aralkyl radical, and $n$ is an integer equal to one less than the valence of $R_5$.

---

This invention relates to polyurethanes stabilized against degradation due to light and oxidation and to a method of stabilizing such polymers. More particularly, it relates to specific stabilizing agents for polyurethanes.

Synthetic plastics comprising urethane groups, such as can be produced by a large number of processes, using the polyisocyanate addition process, from polyisocyanates and polyhydroxyl compounds generally of relatively high molecular weight, and if desired, chain extenders such as glycols, water, polyamines, hydrazine, polyhydric hydrazides or semicarbazides, are widely used because of their favorable properties, particularly high tensile strength, resistance to abrasion, resistance to hydrolysis and high elasticity. These polyurethanes are fabricated into foils, coatings, lacquers, foam materials, elastomers and fibers.

However, a disadvantage for a number of intended uses is that many polyurethane compositions have insufficient stability under the action of light (sunlight or ultraviolet radiation), particularly in the presence of oxygen (air) because they discolor and the physical properties decrease. This applies particularly to products having a relatively large surface area, such as fibers, foils, coatings and foam plastics.

Whereas elastic polyester urethanes are relatively stable to oxygen and ozone, polyether urethanes show a relatively rapid reduction in strength due to oxidation, especially under the simultaneous action of light.

It is, of course, already known to obtain polyurethane compositions with relatively good light stability by using aliphatic diisocyanates, such as hexamethylene diisocyanate, for the formation of the polyurethanes. However, the more reactive, aromatic polyisocyanates and in particular, isomeric mixtures of toluylene diisocyanates, naphthalene-1,5-diisocyanate and diphenylmethane-4,4′-diisocyanate are much more widely used in the industry.

Polyurethane compositions formed using aromatic polyisocyanates frequently show a relatively quick and marked discoloration through yellow to brown on being exposed to sunlight or to artificial light sources, particularly those with a high proportion of ultraviolet rays, and this discoloration is frequently associated with a decrease in their mechanical strength properties.

It has been heretofore known to use many different substances to reduce the aging and deterioration of the polyurethane compositions due to the action of air or oxygen and light, such as various antioxidants, ultraviolet absorbers or combinations thereof. Such substances include, for example, phenthiazine, phenyl-β-naphthylamine, dinaphthyl-β-phenylene diamine, 2-mercaptoimidazoline and derivatives of o,o′-dihydroxybenzophenone or o,o′-dihydroxydiphenylmethane. Certain esters of phosphorous acid are also intended to inhibit the degradation due to oxidation in light. Carbon black has a certain effect as age resister. It is certainly possible with these substances to obtain some protection against degradation, but the natural colors of, and the discolorations caused by the antioxidants or ultraviolet absorbers are disadvantageous and their light-stabilizing action is insufficient.

For polyurethane compositions which are colorless or have light-colored pigmentation, in particular highly elastic fibers, foils, textile coatings and foam plastics, it is further necessary to use stabilizers which have no natural coloring or only a very slight natural coloring and which do not become discolored under the action of light and/or oxygen.

With polyurethane compositions which are based on aromatic diisocyanates, it is relatively difficult to produce an adequate stabilization against discoloration, particularly under the action of light and ultraviolet rays.

It has been established that many stabilizers such as those used for protection against the action of oxygen or ozone in rubber, are ineffective or unsuitable in polyurethane compositions for stabilizing against discoloration under the action of light.

It is therefore an object of this invention to provide polyurethanes stabilized against discoloration and aging. It is another object of this invention to provide a method of stabilizing polyurethanes. It is still another object of this invention to provide polyurethanes stabilized against discoloration caused by light and oxygen.

The foregoing objects and others which will become apparent from the following description are accomplished in accordance with the invention generally speaking by providing polyurethanes stabilized against light and oxygen by incorporating therein a compound having the formula:

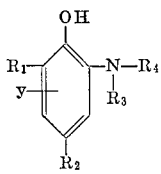

wherein $R_1$ and $R_2$ represent the same or different hydrocarbon radicals with 4 to 10 carbon atoms, the carbon atom adjacent the ring being a tertiary carbon atom; $R_3$ is hydrogen, alkyl, cycloalkyl, alkenyl or aryl; $y$ is hydrogen, alkyl, aralkyl, hydroxyl or halogen; and $R_4$ is hydrogen, alkyl, cycloalkyl, aryl, aralkyl,

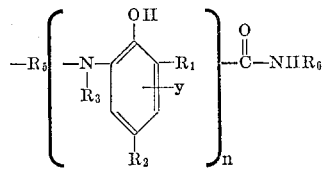

and

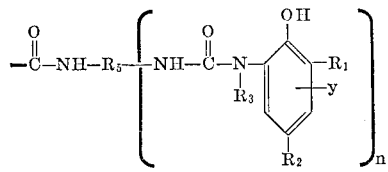

wherein $R_1$, $R_2$, $R_3$ and $y$ have the same meaning as that set forth above, and $R_5$ is a divalent to tetravalent aliphatic or aromatic radical, $R_6$ is hydrogen, alkyl, cycloalkyl, aryl or aralkyl; and $n$ is an integer equal to one less than the valence of $R_5$.

Thus, the invention contemplates the incorporation of a compound having the formula:

(A)

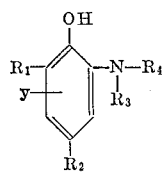

or (B)

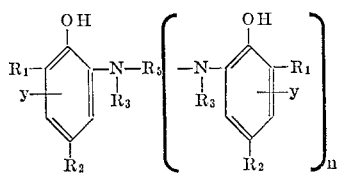

or (C)

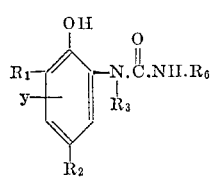

or (D)

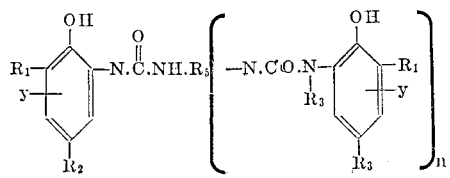

where the different letters have the meaning set forth above into polyurethanes for producing a good protective action against discoloration and degradation under the action of light and ultraviolet rays. A fact which has proved particularly advantageous in this connection is that the above compounds are usually colorless or are only slightly colored and also produce colorless or only slightly colored products after exposure to light and oxidation in the polyurethane composition to be stabilized.

$R_1$ and $R_2$ may be any suitable hydrocarbon radical with 4 to 10 carbon atoms where the carbon atom adjacent the ring is a tert. carbon atom such as, for example, tert. butyl, tert. pentyl, tert. hexyl, tert. heptyl, tert. octyl, tert. nonyl, tert. decyl, and any of the positional isomers thereof. $R_3$ is hydrogen, alkyl, such as, for example, methyl, ethyl, n-propyl, isopropyl, n-butyl, isobutyl, sec-butyl, t-butyl, n-pentyl and various positional isomers thereof, such as, for example, 1-methyl-butyl, 2-methyl-butyl, 3-methyl-butyl, 1,1-dimethylpropyl, 1,2-dimethylpropyl, 2,2-dimethylpropyl, 1-ethylpropyl and the like; corresponding straight and branched chain isomers of hexyl, heptyl, octyl, nonyl, decyl, undecyl, dodecyl, tridecyl, tetradecyl, pentadecyl, hexadecyl, heptadecyl, octadecyl, nondecyl, eicosyl and the like; cycloalkyl, such as, for example, cyclopropyl, cyclobutyl, cycloamyl, cyclohexyl, cycloheptyl, cyclooctyl, cyclododecyl, α-cyclopropyl-ethyl, β-cyclopropyl-ethyl, α-cyclobutyl-propyl, β - cyclobutyl - propyl, gamma-cyclobutyl-propyl, α-cycloamyl-isopropyl, β-cycloamyl-isopropyl and the like; alkenyl, such as, for example, ethenyl, 1-propenyl, 2-propenyl, isopropenyl, 1-butenyl, 2-butenyl, 3-butenyl, 1-isobutenyl, 2-isobutenyl, 1-sec-butenyl, 2-sec-butenyl, 1-methylene-2-propenyl, 1-pentenyl, 2-pentenyl, 3-pentenyl, 4-pentenyl, 1-hexenyl, 2-hexenyl, 3-hexenyl, 4 - hexenyl, 5 - hexenyl, 3,3-dimethyl-1-butenyl, 2,3-dimethyl-1-butenyl, 2,3-dimethyl-2-butenyl, 2,3-dimethyl-3-butenyl, 1-methyl-1-ethyl-2-propenyl; and the various isomers of heptenyl, octenyl, nonenyl, decenyl, undecenyl, dodecenyl, tridecenyl, tetradecenyl, pentadecenyl, hexadecenyl, heptadecenyl, octadecenyl, nondecenyl, eicosenyl and the like; aryl, such as, for example, phenyl, α-naphthyl, β-naphthyl, α-anthryl, β-anthryl, gamma-anthryl, indene, isoindene, acenaphthene, fluorene, phenanthrene, naphthacene, chrysene, pyrene, triphenylene and the like.

$y$ is hydrogen, hydroxyl, alkyl such as those mentioned above with regard to $R_3$; aralkyl, such as, for example, benzyl, α-phenyl-ethyl, β-phenyl-ethyl, α-phenyl-propyl, β-phenyl-propyl, gamma-phenyl-propyl, α-phenyl-isopropyl, β-phenyl-isopropyl, α-phenyl-butyl, β-phenyl-butyl, gamma-phenyl-butyl, delta-phenyl-butyl, α-phenyl-isobutyl, β-phenyl-isobutyl, gamma-phenyl-isobutyl, α-phenyl-sec-butyl, β-phenyl-sec-butyl, gamma-phenyl-sec-butyl, β-phenyl-t-butyl, α'-naphthyl-methyl, β'-naphthyl-methyl, α-(α'-naphthyl)-ethyl, α-(β'-naphthyl)-ethyl, β-(α'-naphthyl)-ethyl, β-(β'-naphthyl)-ethyl, α-(α'-naphthyl)-propyl, α-(β'-naphthyl)-propyl, β-(α'-naphthyl)-propyl, β-(β'-naphthyl)-propyl, gamma-(α'-naphthyl)-propyl, gamma-(β'-naphthyl)-propyl, α-(α'-naphthyl)-isopropyl, α-(β'-naphthyl)-isopropyl, α-(α'-naphthyl)-butyl, α-(β'-naphthyl)-butyl, β-(α'-naphthyl)-butyl, β-(β'-naphthyl)-butyl, gamma-(α'-naphthyl)-butyl, gamma-(β'-naphthyl)-butyl, delta-(α'-naphthyl)-butyl, α-(α'-naphthyl)-isobutyl, α-(β'-naphthyl)-isobutyl, β-(α'-naphthyl)-isobutyl, α-(β'-naphthyl)-isobutyl, gamma-(α'-naphthyl)-isobutyl, gamma-(β'-naphthyl)isobutyl, α-(α'-naphthyl)-sec-butyl, α-(β'-naphthyl)-sec-butyl, β-(α'-naphthyl)-sec-butyl, β-(β'-naphthyl)-sec-butyl, gamma-(α'-naphthyl)-sec-butyl, gamma-(β'-naphthyl)-sec-butyl, β-(α'-naphthyl)-t-butyl, β-(β'-naphthyl)-t-butyl and the like; halogen, such as, for example, chlorine, fluorine, bromine, iodine and the like.

In addition to being any of the radicals represented by the formulas above, $R_4$ may be hydrogen, alkyl, cycloalkyl, aryl, aralkyl and the like, such as those mentioned above in the definition of $R_3$ and $y$. $R_5$ is any suitable divalent, trivalent or tetravalent, aliphatic or aromatic radical, such as, for example, methylene, ethylene, propylene, butylene, pentylene, hexylene, cyclohexylene, phenylene, naphthylene, xylylene, methine, butanedixylidene, 1-propanyl-3-xylidene, 1,2,3-propanetriyl, 1,3-propanediyl-2-xylidene and the radicals —HC=CH—

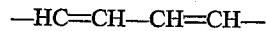

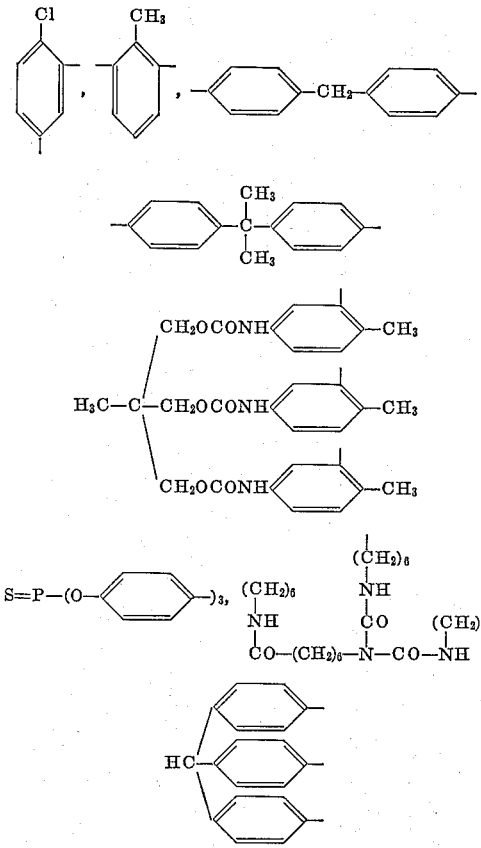

$R_6$ may be any of the appropriate radicals set forth above with regard to the definition of $R_4$.

The surprising discovery has been made that the compounds with an aromatic amino group produce a stabilizing effect against light and oxidation, practically without any discoloration, although it is known that there is strong discoloration upon adding aromatic amines to polyurethane compositions which have, for example, been formed with hydrazine or diamines as chain extenders. It was similarly not to be predicted that the compounds with a urea grouping, which can likewise be substituted on both sides with aromatic radicals, would have a stabilizing action, since it is just these polyurethanes with such urea groupings which constitute substances to be stabilized.

The production of the stabilizing compounds A and B can be carried out in accordance with the processes described in German patent specifications 1,104,522, 1,115,255 and 1,119,297, by reacting pyrocatechols substituted with 4,6-tertiary alkyl groups with primary saturated or unsaturated aliphatic, cycloaliphatic, araliphatic or aromatic amines or polyamines in inert solvents under the action of oxygen.

Any suitable compound within the general formula set forth above may be used as stabilizers according to the invention, such as, for example:

TYPE A 4,6-di-tert.-butyl-2-aminophenol
4,6-di-tert.-butyl-2-methylaminophenyl
4,6-di-tert.-butyl-2-isopropylaminophenol
4,6-di-tert.-butyl-2-tert.-butylaminophenol
4,6-di-tert.-butyl-2-cyclohexylaminophenol
4,6-di-tert.-butyl-2-allylaminophenol
4,6-di-tert.-butyl-2-($\alpha$-dimethylaminopropylamino)-phenol
4,6-di-tert.-butyl-2-$\beta$-hydroxyethylaminophenol
N,N'-bis-(2-hydroxy-3,5-di-tert.-butyl benzene)-hexamethylene diamine
4,6-di-tert.-butyl-3-hydroxy-2-butyl-aminophenol, and
4,6-di-tert-amyl-2-tert.butylaminophenol and the like.

TYPE B

By reacting compounds of Type A with aldehydes or ketones, there are obtained compounds of Type B, such as N,N'-methylene-bis-(2-tert.-butylamino - 4,6 - di-tert.-butylphenol) and N,N'-methylene-bis-(2n-propylamino-4,6-di-tert.-butylphenol) and the like.

Type C and Type D compounds formed from compounds of Type A by reaction with monoisocyanates or diisocyanates such as, for example, N-phenyl-N'-tert.-butyl, N'-2-hydroxy-3,5-di-tert.-butyl benzene or N-phenyl-N'-methyl, N'-2-hydroxy-3,5-di-tert.-butyl benzene or the reaction products of 1 mol of hexane-1,6-diisocyanate with 2 mols of 4,6-di-tert.-butyl-2-methylaminophenol or with 2 mols of 4,6-di-tert.-butyl-2-cyclohexylaminophenol and the like.

The compounds of Types C and D have proven to be especially suitable for stabilization against discoloration and oxidation under the action of light or ultraviolet rays and have a number of advantages over the compounds of the Types A and B, more especially on account of their nonbasic reaction and their greatly reduced water solubility.

The compounds are either oils of low volatility or generally crystalline compounds which can be dissolved in organic solvents such as alcohol, tetrahydrofuran, dimethyl formamide or dimethyl sulphoxide. The compounds are sparingly soluble or practically insoluble in water.

The admixture of the stabilizers with the polyurethane compositions is effected in quantities of about 0.1 to about 10% by weight, preferably about 0.3 to 3% by weight, and is preferably adapted to the process for the production of polyurethanes.

Any suitable aromatic polyisocyanate may be used to produce polyurethanes which can be stabilized by the process of the present invention such as, for example:

m-phenylene diisocyanate
4,4'-diphenylmethane diisocyanate
2,4-toluylene diisocyanate
2,6-toluylene diisocyanate
3,3'-dimethyl-4,4'-biphenylene diisocyanate
3,3'-dimethoxy-4,4'-biphenylene diisocyanate
3,3'-diphenyl-4,4'-biphenylene diisocyanate
4,4'-biphenylene diisocyanate
3,3'-dichloro-4,4'-biphenylene diisocyanate
p,p',p"-triphenylmethane triisocyanate
1,5-naphthalene diisocyanate or polyisocyanates in a blocked or inactive form such as the bis-phenyl carbamates of 2,4- or 2,6-toluylene diisocyanate, p,p'-diphenylmethane diisocyanate, p-phenylene diisocyanate, 1,5-naphthalene diisocyanate and the like. It is preferred to use the commercially available mixture of toluylene diisocyanates which contans 80 percent 2,4-toluylene diisocyanate and 20 percent 2,6-toluylene diisocyanate or 4,4'-diphenylmethane diisocyanate. Suitable polyisocyanates are also found in U.S. Patent 2,957,852.

Any suitable organic compound containing at least two active hydrogen containing groups as determined by the Zerewitinoff method, said groups being reactive with an isocyanate group, may be reacted with an organic polyisocyanate to prepare polyurethanes which can be stabilized in accordance with the process of the present invention. The active hydrogen atoms are usually attached to oxygen, nitrogen or sulphur atoms. Thus, suitable active hydrogen containing groups as determined by the Zerewitinoff method which are reactive with an isocyanate group include —OH, —NH₂, —NH—, —COOH, —SH and the like. Examples of suitable types of organic compounds containing at least two active hydrogen containing groups which are reactive with an isocyanate group are hydroxyl polyesters, polyhydric polyalkylene ethers, polyhydric polythioethers, polyacetals, aliphatic polyols, including alkane, alkene and alkyne diols, triols, tetrols and the like, aliphatic thiols including alkane, alkene, and alkyne thiols having two or more —SH groups; polyamines including both aromatic, aliphatic and heterocyclic diamines, triamines, tetramines and the like; as well as mixtures thereof. Of course, compounds which contain two or more different groups within the above-defined classes may also be used such as, for example, amino alcohols which contain an amino group and an hydroxyl group, amino alcohols which contain two amino groups and one hydroxyl group and the like. Also, compounds may be used which contain one —SH group and one —OH group or two —OH groups and one —SH group as well as those which contain an amino group and a —SH group and the like.

The molecular weight of the organic compound containing at least two active hydrogen containing groups is not critical. Preferably, however, at least one of the organic compounds containing at least two active hydrogen containing groups which is used in the production of the polyurethane plastic has a molecular weight of at least about 200 and preferably between about 500 and about 5000 with an hydroxyl number within the range of from about 25 to about 800 and acid numbers, where applicable, below about 5. A satisfactory upper limit for the molecular weight of the organic compound containing at least two active hydrogen containing groups is about 10,000 but this limitation is not critical so long as satisfactory mixing of the organic compound containing at least two active hydrogen containing groups with the organic polyisocyanate can be obtained. In addition to the high molecular weight organic compound containing at least two active hydrogen containing groups, it is desirable to use an organic compound of this type having a molecular weight below about 750 and preferably below about 500. Aliphatic diols and triols are most preferred for this purpose.

Any suitable hydroxyl polyester may be used such as are obtained, for example, from polycarboxylic acids and polyhydric alcohols. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α-β-diethyl-succinic acid, isophthalic acid, terephthalic acid, hemimellitic acid, trimellitic acid, trimesic acid, mellophanic acid, prehnitic acid, pyromellitic acid, benzenepentacarboxylic acid, 1,4-cyclohexane-dicarboxylic acid, 3,4,9,10-perylene-tetracarboxylic acid, and the like. Any suitable polyhydric alcohol may be used such as, for example, ethylene glycol, 1,3-propylene glycol, 1,2-propylene glycol, 1,4-butylene glycol, 1,3-butylene glycol, 1,2-butylene glycol, 1,5-pentanediol, 1,4-pentanediol, 1,3-pentanediol, 1,6-hexanediol, 1,7-heptanediol, glycerine, trimethylol propane, 1,3,6-hexanetriol, triethanolamine, pentaerythritol, sorbitol and the like.

Any suitable polyhydric polyalkylene ether may be used such as, for example, the condensation product of an alkylene oxide or of an alkylene oxide with a polyhydric alcohol. Any suitable polyhydric alcohol may be used such as those disclosed above for use in the preparation of the hydroxyl polyesters. Any suitable alkylene oxide may be used such as, for example, ethylene oxide, propylene oxide, butylene oxide, amylene oxide and the like. Of course, the polyhydric polyalkylene ethers can be prepared from other starting materials such as, for example, tetrahydrofuran, epihalohydrins such as, for example, epichlorohydrin and the like as well as aralkylene oxides such as, for example, styrene oxide and the like. The polyhydric polyalkylene ethers may have either primary or secondary hydroxyl groups and preferably are polyhydric polyalkylene ethers prepared from alkylene oxides having from two to five carbon atoms such as, for example, polyethylene ether glycols, polypropylene ether glycols, polybutylene ether glycols and the like. It is often advantageous to employ some trihydric or higher polyhydric alcohol such as glycerine, trimethylol propane, pentaerythritol and the like in the preparation of the polyhydric polyalkylene ethers so that some branching exists in the products. Generally speaking, it is advantageous to condense from about 5 to about 30 mols of alkylene oxide per functional group of the trihydric or higher polyhydric alcohol. The polyhydric polyalkylene ethers may be prepared by any known process such as, for example, the process disclosed by Wurtz in 1859 and Encyclopedia of Chemical Technology, volume 7, pp. 257–262, published by Interscience Publishers, Inc. (1951) or in U.S. Patent 1,922,459.

Any suitable polyhydric polythioether may be used such as, for example, the condensation product of thiodiglycol or the reaction product of a polyhydric alcohol such as is disclosed above for the preparation of the hydroxyl polyesters with any other suitable thioester glycol. Other suitable polyhydric polythioethers are disclosed in U.S. Patents 2,862,972 and 2,900,368.

The hydroxyl polyester may also be a polyester amide such as is obtained, for example, by including some amine or amino alcohol in the reactants for the preparation of the polyesters. Thus, polyester amides may be obtained by condensing an amino alchol such as ethanolamine with the polycarboxylic acids set forth above or they may be made using the same components that make up the hydroxy polyester with only a portion of the components being a diamine such as ethylene diamine and the like.

Any suitable polyacetal may be used such as, for example, the reaction product of formaldehyde or other suitable aldehyde with a polyhydric alcohol such as those disclosed above for use in the preparation of the hydroxyl polyesters.

Any suitable aliphatic polyol may be used such as, for example alkane diols such as, for example, ethylene glycol, 1,3-propylene glycol, 1,2-propylene glycol, 1,4-butylene glycol, 1,3-butylene glycol, 1,5-pentanediol, 1,4-butanediol, 1,3-pentanediol, 1,6-hexanediol, 1,7-heptanediol, 2,2-dimethyl-1,3-propanediol, 1,8-octanediol and the like including 1,20-eicosanediol and the like; alkene diols such as, for example, 1-butene-1,4-diol, 1,3-butadiene-1,4-diol, 2-pentene-1,5-diol, 2-hexane-1,6-diol, 2-heptene-1,7-diol and the like; alkyne diols such as, for example, 2-butyne-1,4-diol, 1,5-hexadyne-1,6-diol and the like; alkane triols such as, for example, 1,3,6-hexanetriol, 1,3,7-heptane triol, 1,4,8-octane triol, 1,6,12-dodecane triol and the like; alkene triols such as, 1-hexyne-1,3,6-triol and the like; alkyne triols such as, 2-hexyne-1,3,6-triol and the like; alkane tetrols such as, for example, 1,2,5,6-hexane tetrol and the like; alkene tetrols such as, for example, 3-heptene-1,2,6,7-tetrol and the like; alkyne tetrols such as, for example, 4-octyne-1,2,7,8-tetrol and the like.

Any suitable aliphatic thiol including alkane thiols containing two or more -SH groups may be used such as, for example 1,2-ethane dithiol, 1,2-propane dithiol, 1,3-propane dithiol, 1,6-hexane dithiol, 1,3,6-hexane trithiol and the like; alkene thiols such as, for example, 2-butene-1,4-dithiol and the like; alkyne thiols such as, for example, 3-hexyne-1,6-dithiol and the like.

Any suitable polyamine may be used including for example, aromatic polyamines such as, for example, hydrazine, p-amino aniline, 1,5-diamino naphthalene, 2,4-diamino toluylene, 1,3,5-benzene triamine, 1,2,3-benzene triamine, and the like; aliphatic polyamines such as, for example, ethylene diamine, 1,3-propylene diamine, 1,4-butylene diamine, 1,3-butylene diamine, diethylene triamine, triethylene tetramine, 1,3,6-hexane triamine, 1,3,5,7-heptane tetramine and the like, m-xylylene diamine, heterocyclic polyamines such as, for example, 2,6-diamino pyridine, 2,5-diamino-1,3,4-thiadiazol and the like.

Other alcohol compounds which do not necessarily fit within any of the previously set forth classes of compounds and which nevertheless contain active hydrogen containing groups which are quite suitable for the production of the polyurethane plastics of the present invention are pentaerythritol, sorbitol, triethanolamine, mannitol, N,N,N',N'-tetrakis(2-hydroxy propyl)ethylene diamine, as well as compounds of any of the classes set forth above which are substituted with halogen such as, for example, chloro, iodo, bromo and the like; nitro, alkoxy, such as, for example methoxy, ethoxy, propoxy, butoxy and the like; carboalkoxy such as, for example, carbomethoxy, carbethoxy and the like; carbonyl, mercapto, thiocarbonyl, phosphoryl, phosphato and the like.

The polyurethane compositions which are to be stabilized can be obtained by generally known processes.

By way of example, by reaction of polyhydroxyl compounds which are if desired, of relatively high molecular weight and excess quantities of polyisocyanates, there is first of all produced a prepolymer with terminal isocyanate groups and this is then reacted with chain extenders, often known as cross-linking agents, i.e., polyvalent compounds which are generally of low molecular weight and contain reactive hydrogen atoms.

The polyurethane compositions which are stabilized in a particularly effective manner by the compounds claimed are those which are based on aromatic diisocyanates which contain the grouping —NH.CO.NH— in addition to urethane bonds. This grouping can also represent a part of groupings such as —NH.CO.NH.NH—, —NH.CO.NH.NH.CO—, —NH.CO.NH.NH.CO.NH—, —NH.CO.NH.NH.CO.O— or
—NH.CO.NH.NH.CO.NH.NH.CO.NH—.

Some of the hydrogen atoms on the nitrogen atoms can also be replaced by an organic radical. Such groupings are formed, for example, by reacting the isocyanate groupings with water, primary or secondary amines, hydroxyamines, hydrazines, polyhydrazides, polysemicarbazides, polycarbazinic esters, carbohydrazide and other NH-active chain extenders or cross-linking agents. (German Patents 1,123,467 and 1,157,386).

When using aliphatic diamines, hydrazines or hydrazides and similar compounds with reactive NH-groupings as chain extenders, the reaction thereof with the substantially linear NCO initial adducts is preferably carried out in highly polar solvents such as dimethyl formamide, dimethyl acetamide or dimethyl sulphoxide. The stabilizers can readily be dissolved in the solutions which are obtained or they can be added thereto in an already dissolved form. It is also possible for the stabilizers to be added to the NCO prepolymer solution before adding the chain extenders and only then to carry out the polyaddition.

The stabilizers can also be added to the melts of the NCO prepolymers, and from these latter, foam plastics can be produced, for example, with water or other inert blowing agents such as halohydrocarbons including dichlorodifluoroethane, trifluorochloromethane, trichlorotrifluoroethane and the like by known processes. By introducing polyhydroxyl compounds, e.g., butane-1,4-diol or aromatic diamines (e.g. 3,3'-dichloro-4,4'-diaminodiphenylmethane) as chain extenders, elastomers are obtainable and elastomeric fibers can be obtained by spinning into solutions of aliphatic diamines.

If elastomers, foam plastics or lacquers are produced in the single-step process, corresponding quantities of these stabilizers can be admixed with one of the components, preferably the polyhydroxyl compounds of higher molecular weight or the chain extenders.

It is also possible for the stabilizers to be incorporated into solid polyurethane compositions, e.g. thermoplastic polyurethane elastomers, by incorporation in kneaders or on rolling mills or by homogenization in extruders.

The stabilizers can also be applied by dipping or by spraying with solutions or emulsions particularly for foam plastics and fibers.

Compounds with at least two reactive hydrogen atoms according to the Zerewitinoff test, such as diols or triols, hydroxyamines, possibly substituted hydrazines, polyhydrazides, polycarbazinic esters and polysemicarbazides, diamines and polyamines and mercapto-compounds may serve as chain extenders or cross-linking agents.

The stabilizers are present in the polyurethane compositions, either in dissolved form, or are for example, fixed in the mass by reaction with isocyanate groups. Whereas generally the hydroxyl groups and the urea groups of the stabilizers (e.g. in types C and D) do not react with the isocyanates or only react therewith to a minor degree under the reaction conditions of the polyaddition, it is possible when there are (secondary) amino groups in the stabilizers (types A and B, $R_3$=H) for an addition to the NCO groups of the diisocyanate or NCO initial adduct to take place. By this means, the stabilizers are fixed in the end product and are not able to migrate or be washed out of said product, this proving to be very advantageous, particularly for fibers and coatings.

A further improvement in the protective action against the effect of light and ultra-violet rays may be produced by using other ultra-violet stabilizers or antioxidants in addition to those according to the invention.

As examples of such stabilizers there may be mentioned compounds of the benzophenone or diphenylmethane type, e.g., 2,2'-dihydroxy-4,4'-dimethoxybenzophenone
2,4'-dihydroxy-4-methoxy-3,3'-di-tert.-butylbenzophenone
2,2'-trihydroxy-5-tert.-butylbenzophenone
2,4-dihydroxy-3,5-diisopropylbenzophenone
2,2'-dihydroxy-4,4'-dimethyl-6,6'-di-tert.-butyl-diphenylmethane
4,4'-dihydroxy-2,2'-dimethyl-5,5'-diisopropyl-diphenylsulphide
4,4'-dimethoxy-3,5-di-tert.-butylbenzophenone, and
4-hydroxy-3,5-di-tert.-butyl-4'-methoxybenzophenone.

Other suitable compounds include 2-benzyl-6-tert.-butyl-4-methylphenol
2,6-diisopropyl-4-methylphenol
4,4'-butylidene-bis-(3-methyl-6-tert.-butylphenol)
2,5-di-tert.-butylhydroquinone
2,5-di-tert.-amyl hydroquinone
2,6-di-tert.-butyl-4-methylphenol
1-acetyl-4-benzoyl resorcinol
3,4-tris-(α-methylbenzyl)-phenol
3,5-di-tert.-butyl-4-hydroxybenzylmethylether, and
4-hydroxy-3,5-di-tert.-butyl benzyl hydrazide, as well as practically water-insoluble stabilizer of relatively high molecular weight, such as, for example, from cyanuric chloride and hydroxybenzophenones; hydroxy bentriazoles, e.g., 2,4 - dichloro-6-(3 - hydroxybenzoylphenoxy)-triazine and esterification products of 3 - hydroxy-4-benzoyl phenoxyacetic acid with polyhydroxy compounds.

Other combinations include those mentioned for example in German specifications 1,126,603 and 1,106,490. Hydrazide compounds according to copending U.S. patent application Serial No. 264,776 can also be employed. Polyethylene imide compounds, as disclosed in DAS 1,153,161 give a highly surprising additional stabilising effect together with the compounds of this disclosure.

The polyurethane compositions can in addition, contain pigments, e.g. titanium dioxide in the rutile or anatase modifications, as well as talcum, silicates or also colored pigments or dyestuffs.

The invention is further illustrated but not limited by the following examples in which parts are by weight unless otherwise specified.

*Example 1*

About 350 parts of a polyester of adipic acid and an equimolar mixture of ethylene glycol and butane-1,4-diol (OH number 56; acid number 1) are heated with about 79.1 parts of diphenylmethane-4,4'-diisocyanate in about 184 parts of chlorobenzene for about 60 minutes to about 98 to about 100°. The NCO number of the NCO initial prepolymer is 1.59% after cooling. About 570 parts of this 70% NCO initial prepolymer solution are reacted while stirring vigorously with a solution of about 11.71 parts of carbodihydrazide in about 68 parts of water and about 1667 parts of dimethyl formamide and produce an approximately 18.5% solution with a viscosity of 45 poises/20° which is brought up to 5% pigment content by adding about 62.5 parts of a 33.3% titanium dioxide (rutile) paste. The solution is then concentrated using a thin-film evaporator to a concentration of 24.8% and a viscosity of 316 poises/20°.

The stabilizers (dissolved in a little dimethyl formamide or dimethyl sulphoxide) are incorporated by stirring in portions with the elastomer solution as prepared above. These solutions are cast by means of suitable casting devices onto glass sheets and the solvent is evaporated off in a drying chamber at about 100°. The foils which are obtained and which have a thickness of about 0.1 to 0.2 mm. are thereafter irradiated in Atlas Fadeometer Type FDA-R, with ultraviolet light for the test in respect of discoloration. The results are set out in the following table.

TABLE 1

| | Stabilizer | Quantity, Percent | Discoloration after exposure to light in Fadeometer | | |
|---|---|---|---|---|---|
| | | | 10 Hrs. | 20 Hrs. | 50 Hrs. |
| | Without Stabilizer | | Yellowish | Yellowish brown | Brownish yellow. |
| I | 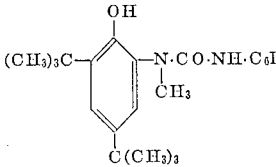 | 2.0<br>1.0<br>0.5 | Colorless<br>do<br>Almost colorless | Colorless<br>do<br>Slightly yellowish | Slightly yellowish.<br>Yellow.<br>Do. |
| II | 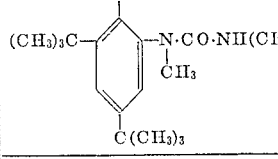 | 2.0<br>1.0 | Colorless<br>Almost colorless | Almost colorless<br>Slightly yellowish | Slightly yellowish.<br>Yellow. |
| III | 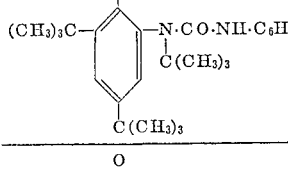 | 2.0 | Colorless | Almost colorless | Almost colorless. |
| IV | 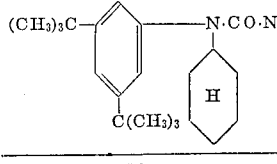 | 2.0 | | Slightly yellowish | Slightly yellowish. |
| V | 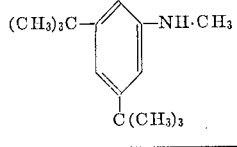 | 2.0 | | Almost colorless | |

Synthesis and properties of the compounds I-IV:

The compounds I-IV are obtained as colorless, crystalline substances of definite melting point in the usual manner by reacting the o-aminophenols (type A) with monoisocyanates or diisocyanates in hydrocarbons, e.g. benzene.

I—M.P. 166–168°.
II—M.P. 267–270° (with decomposition).
III—M.P. 130–132°.
IV—M.P. 240–245° (with decomposition).

*Example 2*

An elastic foam plastic made from an adipic acid/diethylene glycol polyester, toluylene diisocyanate (isomer ratio 65:35) and water is cut into strips of foam with a width of about 1 cm. and a thickness of 0.4 mm. and dipped in 3% methanolic solutions of the stabilizers indicated below, squeezed out, dried in air and exposed to ultra-violet light with a comparison sample in a Fadeometer.

The results after 600 and 1200 minutes irradiation are set out in the following table.

| Stabilizer | Discoloration after exposure to light in Fadeometer | |
|---|---|---|
| | 600 minutes | 1,200 minutes |
| Without stabilizer. | Yellow | Yellowish brown. |
| III | Almost colorless | Slightly yellowish. |
| I | do | Slightly grey. |

Example 3

About 200 parts of a polytetramethylene ether glycol (OH number 91) dehydrated by heating for one hour to about 120°/12 mm. Hg are heated with about 15.35 parts of toluylene-2,4-diisocyanate for one hour to about 100° C. and, after cooling to about 75° C., heated with a solution of about 44.0 parts of diphenylmethane-4,4'-diisocyanate in about 65 parts of dioxane for about 75 minutes to about 100°. After cooling to room temperature, the reaction product has an isocyanate content of 2.145%.

About 120 parts of the prepolymer is run into a solution of about 2.65 parts of carbodihydrazide in about 365 parts of dimethyl formamide over five minutes with vigorous stirring, the solution being at a temperature of about 70°, and thereupon a viscous elastomeric solution is thus formed. By stirring in about 14.4 parts of a 33% titanium dioxide (rutile)/dimethyl formamide pigment paste, the solution is given a pigment content of about 5% of $TiO_2$ (based on the solid content). The viscosity of the pigmented elastomer solution is 95 poises/20°.

The quantities indicated below 0.2 parts and 0.4 parts of light-protection agents, dissolved in about 5 to about 10 parts by volume of warm dimethyl formamide, are added in each case to about 100 parts of the elastomer solution and homogenized by stirring for about 30 minutes. By pouring onto glass sheets by means of a casting device and evaporating the solvent, highly elastic, colorless films with a thickness of about 0.1 mm. are obtained, and these films are exposed to light in the form of narrow strips about 1 cm. wide in an Atlas Fadeometer, Type FDA–R, at about 55° and about 65° relative air humidity.

| | Exposure to light in Fadeometer | |
|---|---|---|
| | 600 minutes | 1,200 minutes |
| Without addition | Yellowish brown | Yellow brown. |
| 1% I | Yellowish | Slightly yellow brown. |
| 2% I | Slightly yellowish | Yellow. |

From the original films, rectangular filaments are cut with a foil-cutting machine and exposed to light for about 22 hours in the Fadeometer. The exposed filaments are tested for tensile strength and breaking elongation:

| | Count | Tensile strenght (g./den.) | Breaking elongation (percent) |
|---|---|---|---|
| Without addition | 800 | 0.06 | 180 |
| 2% I | 800 | 0.31 | 675 |

Example 4

About 95 parts of the NCO prepolymer prepared in Example 3 is run into a solution of about 1.23 parts of hydrazine hydrate in about 304 parts of dimethyl formamide in about 5 minutes with vigorous stirring. The slightly yellow solution is pigmented with about 11.5 parts of a 33% $TiO_2$ paste according to Example 3 so that it is given a pigment content of approximately 5% based on the solid content. The solution has a viscosity of 100 poises/20°.

As described in Example 3, foils are produced from the above solution, and also with an addition of 1 and 2% stabilizer and exposed to light in a Fadeometer.

| | Exposure to light in Fadeometer | |
|---|---|---|
| | 600 minutes | 1,200 minutes |
| Without addition | Yellow brown | Brownish yellow. |
| 1% I | Slightly discolored | Yellowish. |
| 2% I | do | Slightly discolored. |

Rectangular filaments with an individual count of about 800 den. are cut from the foils without additive and also from the foils with 2% of the above light-protective agent by means of a foil-cutting machine and exposed to light for about 22 hours in a Fadeometer. The filaments, after exposure to light, show the following properties:

| | Tensile strength (g./den.) | Breaking elongation (percent) |
|---|---|---|
| Without addition | 0.04 | 80 |
| 2% I | 0.23 | 570 |

Example 5

About 0.3 part by volume of a 35% solution of $SO_2$ in dioxane are added to about 600 parts of an adipic acid - (hexane - 1,6-diol-2,2-dimethyl propane-1,3-diol)-polyester (molar ratio of the glycols 65:35; OH number 60.0; acid number 1.42) and dehydrated for about one hour in water jet vacuum at about 130° C. After cooling to about 70° C., about 185 parts of chlorobenzene and about 135.4 parts of pure diphenylmethane-4,4'-diisocyanate are added to the polyester and this mixture is heated for two hours in a boiling water bath. After cooling, the solution has an NCO content of 1.84%.

About 852 parts of the NCO prepolymer solution as prepared above are run into a solution of about 18.25 parts of carbohydrazide in about 1793 parts of hot dimethyl formamide with vigorous stirring. After adding the prepolymer solution, a viscous solution is formed which has a viscosity of 225 poises/20°. By stirring in a titanium dioxide (rutile) pigment paste, the solution is given a pigment content of about 2.5% (based on the solid content of the solution).

About 6.32 parts of 2,4-di-tert.-butyl-6-N-methylaminophenol, dissolved in about 10 parts by volume of dimethyl formamide, are added to about 1200 parts of this elastomer solution having hydrazide terminal groups and about 3.31 parts of hexamethylene-1,6-diisocyanate in about 40 parts by volume of chlorobenzene are then added. The viscosity of the solution rises to 342 poises/20°.

Films with a thickness of about 0.1 mm. are cast from the solution, with and without addition of 2,4-di-tert.-butyl-6-N-methylaminophenol and hexamethylene-1,6-diisocyanate and exposed to light in a Fadeometer under the conditions described. Whereas the films without addition have become discolored to a strong yellowish brown after about 50 hours in the Fadeometer, the films with the addition are colorless after the same exposure time. The stabilizer cannot be washed out when the foils are treated with warm water.

It is, of course, to be understood that any of the compounds within the formulas set forth above may be used in place of those specifically used in the examples. Also, any polyurethane can be stabilized using these materials hence any polyurethane can be used in place of those specifically used in the examples.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. Polyurethane polymers stabilized against discoloration and aging by having incorporated therein from about 0.1 to about 10 percent by weight of a compound having the formula:

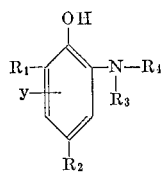

wherein $R_1$ and $R_2$ are hydrocarbon radicals having from 4 to 10 carbon atoms where the carbon atom adjacent the aromatic ring is a tertiary carbon atom; $R_3$ is a member selected from the group consisting of hydrogen, alkyl, cycloalkyl, alkenyl or aryl; $y$ is hydrogen, alkyl, aralkyl, hydroxyl or halogen; $R_4$ is a member selected from the group consisting of hydrogen, alkyl, cycloalkyl, aryl, aralkyl

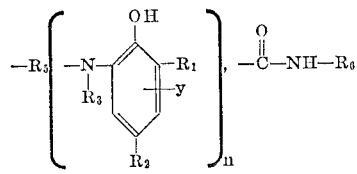

and

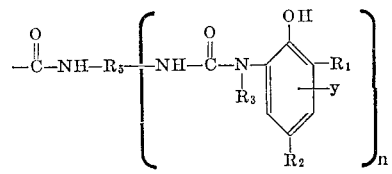

where $R_1$, $R_2$, $R_3$ and $y$ have the same meaning as that set forth above and $R_5$ is a member selected from the group consisting of aliphatic radicals and aromatic radicals, said radical having a valence of 2 to 4; $R_6$ is a member selected from the group consisting of hydrogen, alkyl, cycloalkyl, aryl and aralkyl and $n$ is an integer equal to one less than the valence of $R_5$.

2. The stabilized polyurethane polymer of claim 1 wherein from about 0.3 to about 3 percent by weight of said stabilizer based on the weight of the polyurethane is incorporated.

3. The stabilized polyurethane polymer of claim 1 wherein said polyurethane polymer is a reaction product of an organic polyisocyanate and an organic compound containing active hydrogen atoms which are reactive with NCO groups.

4. The stabilized polyurethane polymer of claim 1 wherein said stabilizer has the formula

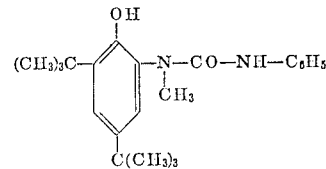

5. The stabilized polyurethane polymer of claim 1 wherein said stabilizer has the formula

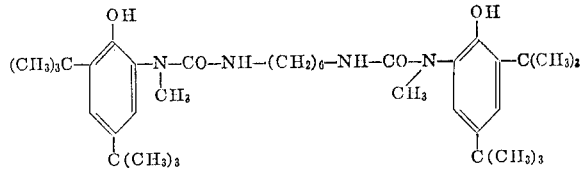

References Cited

UNITED STATES PATENTS 2,983,702   5/1961   Little et al. _____ 260—45.4
3,150,114   9/1964   Rockoff _____ 260—45.95

DONALD E. CZAJA, *Primary Examiner.*

V. P. HOKE, *Assistant Examiner.*